(12) United States Patent
Oikawa et al.

(10) Patent No.: US 6,942,936 B2
(45) Date of Patent: Sep. 13, 2005

(54) PERPENDICULAR MAGNETIC RECORDING MEDIUM AND MAGNETIC RECORDING/ REPRODUCTION APPARATUS

(75) Inventors: Soichi Oikawa, Chiba (JP); Takashi Hikosaka, Tokyo (JP); Hiroshi Sakai, Ichihara (JP); Akira Sakawaki, Ichihara (JP); Kenji Shimizu, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 41 days.

(21) Appl. No.: 10/640,356

(22) Filed: Aug. 14, 2003

(65) Prior Publication Data

US 2004/0033390 A1 Feb. 19, 2004

(30) Foreign Application Priority Data

Aug. 14, 2002 (JP) ........................................ 2002-236645

(51) Int. Cl.$^7$ .............................. G11B 5/66; G11B 5/70
(52) U.S. Cl. ..................................................... 428/828.1
(58) Field of Search .............................. 428/828.1, 827, 428/694 TS, 694 TM, 900, 668, 611

(56) References Cited

U.S. PATENT DOCUMENTS

| | | | |
|---|---|---|---|
| 5,486,967 A | 1/1996 | Tanaka et al. | ............... 360/113 |
| 2002/0036871 A1 | 3/2002 | Yano et al. | ................. 360/317 |
| 2002/0127433 A1 * | 9/2002 | Shimizu et al. | ...... 428/694 TM |

FOREIGN PATENT DOCUMENTS

| | | |
|---|---|---|
| JP | 1-277321 | 11/1989 |
| JP | 5-109044 | 4/1993 |
| JP | 5-266455 | 10/1993 |
| JP | 6-103550 | 4/1994 |
| JP | 7-73429 | 3/1995 |
| JP | 10-228620 | 8/1998 |
| JP | 2000-76647 | 3/2000 |
| JP | 2000-348327 | 12/2000 |
| JP | 2002-203306 | 7/2002 |

OTHER PUBLICATIONS

Machine translation of JP 10–228620, Tsuboi Shindo et al., Aug. 1998.*
Austrian Search and Examination Reports, dated Mar. 26, 2004 for Patent Application No. 200306009-2.
Japanese Office Action for Japanese Patent Application No. 2002–236645, dated Sep. 14, 2004.

* cited by examiner

*Primary Examiner*—Holly Rickman
(74) *Attorney, Agent, or Firm*—Pillsbury Winthrop Shaw Pittman LLP

(57) ABSTRACT

A medium having at least a nonmagnetic substrate, soft magnetic backing layer, soft magnetic underlayer, and perpendicular magnetic recording layer, and An oxidized layer of the soft magnetic backing layer is also formed on the soft magnetic backing layer, and the soft magnetic underlayer has a three-layered structure including a first soft magnetic layer, interlayer, and second soft magnetic layer, a crystalline orientation control layer, e.g., an Ni orientation control layer is formed between the soft magnetic underlayer and the perpendicular magnetic recording layer.

22 Claims, 4 Drawing Sheets

PERPENDICULAR MAGNETIC RECORDING MEDIUM AND MAGNETIC RECORDING/ REPRODUCTION APPARATUS

CROSS-REFERENCE TO RELATED APPLICATIONS

This application is based upon and claims the benefit of priority from the prior Japanese Patent Application No. 2002-236645, filed Aug. 14, 2002, the entire contents of which are incorporated herein by reference.

BACKGROUND OF THE INVENTION

1. Field of the Invention

The present invention relates to a magnetic recording/reproduction apparatus used as a hard disk drive and, more particularly, to a magnetic recording/reproduction apparatus using perpendicular magnetization, and a perpendicular magnetic recording medium for use in the apparatus.

2. Description of the Related Art

Conventionally, the easy axis of magnetization of a magnetic recording layer is paralleled to a magnetic recording medium. In a perpendicular magnetic recording system, this easy axis of magnetization is perpendicular to the magnetic recording medium. This decreases the demagnetizing field near a magnetization transition region as a boundary between recording bits. Therefore, as the linear recording density increases, the medium becomes magnetostatically stable, and the thermal decay resistance increases. This makes the system suited to increasing the areal recording density. Also, When this high-magnetic-permeability soft magnetic layer is formed, a so-called double layered perpendicular recording medium having a perpendicular magnetic recording layer on the soft magnetic layer is formed. In this double-layered perpendicular recording medium, the soft magnetic layer performs part of the function of a magnetic head for magnetizing the perpendicular magnetic recording layer. That is, a recording magnetic field supplied from the recording head to magnetize the perpendicular magnetic recording layer is moved in the horizontal direction and returned to the magnetic head by this soft magnetic layer. In this manner, the soft magnetic layer can increase the recording capability and the recording/reproduction efficiency.

In this double-layered perpendicular recording medium, however, the soft magnetic backing layer is formed below a perpendicular magnetic recording layer. Accordingly, the material of an underlayer used to reduce the size of grains in the recording layer is considerably limited. In addition, to obtain high recording capability by using the medium in combination with a single-pole head, the space between the soft magnetic backing layer and the recording layer must be narrowed. To form an underlayer between them, the thickness of this underlayer is desirably as thin as possible.

Various proposals have been made to reduce the size of the magnetic grains in a magnetic recording layer and reduce the medium noise of this perpendicular magnetic recording medium. Unfortunately, none of these proposals is satisfactory.

As an example of such proposals, Jpn. Pat. Appln. KOKAI Publication No. 6-103550 discloses a three-layered soft magnetic backing layer including a first soft magnetic layer, a nonmagnetic layer, and a second soft magnetic layer having a thickness of 0.3 $\mu$m or less.

Also, a soft magnetic backing layer having a stacked structure made up of a first soft magnetic layer, oxide layer, second soft magnetic layer, and oxide layer is disclosed in, e.g., Jpn. Pat. Appln. KOKAI Publication No. 10-228620.

BRIEF SUMMARY OF THE INVENTION

According to a first aspect of the present invention, there is provided a perpendicular magnetic recording medium comprising a nonmagnetic substrate, a soft magnetic backing layer formed on the nonmagnetic substrate, an oxidized layer formed by oxidizing a surface of the soft magnetic backing layer, a soft magnetic underlayer having a three-layered structure including a first soft magnetic layer formed on the oxidized layer, an interlayer formed on the first soft magnetic layer, and a second soft magnetic layer formed on the interlayer, and a perpendicular magnetic recording layer formed on the second soft magnetic layer.

According to a second aspect of the present invention, there is provided a perpendicular magnetic recording medium comprising a nonmagnetic substrate, a soft magnetic backing layer formed on the nonmagnetic substrate, an oxidized layer formed by oxidizing a surface of the soft magnetic backing layer, a soft magnetic underlayer formed on the oxidized layer, a crystalline orientation control layer formed on the soft magnetic underlayer, and a perpendicular magnetic recording layer formed on the orientation control layer.

According to a third aspect of the present invention, there is provided a perpendicular magnetic recording medium comprising a nonmagnetic substrate, a soft magnetic backing layer formed on the nonmagnetic substrate, a soft magnetic underlayer formed on the soft magnetic backing layer, a nickel-containing orientation control layer formed on the soft magnetic underlayer, and a perpendicular magnetic recording layer formed on the orientation control layer.

According to a fourth aspect of the present invention, there is provided a magnetic recording/reproduction apparatus comprising a perpendicular magnetic recording medium according to any of the first to third aspects described above, a driving mechanism which supports and rotates the magnetic recording medium, a magnetic head having an element to record information on the perpendicular magnetic recording medium and an element to reproduce the recorded information, and a carriage assembly which supports the magnetic head such that the magnetic head is movable with respect to the magnetic recording medium.

BRIEF DESCRIPTION OF THE SEVERAL VIEWS OF THE DRAWING

The accompanying drawings, which are incorporated in and constitute a part of the specification, illustrate presently embodiments of the invention and, together with the general description given above and the detailed description of the embodiments given below, serve to explain the principles of the invention.

DETAILED DESCRIPTION OF THE INVENTION

Figure 1:
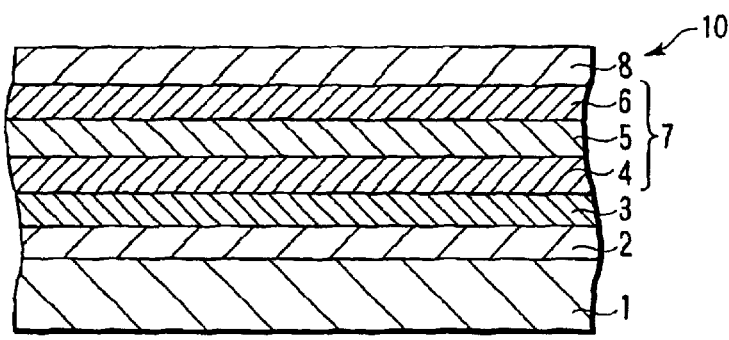
FIG. 1 is a schematic sectional view showing an example of the structure of a perpendicular magnetic recording medium according to the first aspect.

Perpendicular magnetic recording media of the present invention basically have a structure in which a nonmagnetic substrate, soft magnetic backing layer, soft magnetic underlayer, and perpendicular magnetic recording layer are stacked in this order. These perpendicular magnetic recording media are roughly classified into the following three aspects in accordance with the arrangements of the soft magnetic backing layer and soft magnetic underlayer.

A perpendicular magnetic recording medium according to the first aspect is a perpendicular magnetic recording medium in which a nonmagnetic substrate, soft magnetic backing layer, soft magnetic underlayer, and perpendicular magnetic recording layer are stacked in this order, and which further includes an oxidized layer formed by oxidizing the surface of the soft magnetic backing layer, between the soft magnetic backing layer and the soft magnetic underlayer. The soft magnetic underlayer has a three-layered structure including a first soft magnetic layer, interlayer, and second soft magnetic layer.

In this perpendicular magnetic recording medium according to the first aspect, it is possible to reduce the size of the magnetic grains in the perpendicular magnetic recording layer and reduce the medium noise.

A perpendicular magnetic recording medium according to the second aspect is a perpendicular magnetic recording medium in which a nonmagnetic substrate, soft magnetic backing layer, soft magnetic underlayer, and perpendicular magnetic recording layer are stacked in this order, and which further includes an oxidized layer formed by oxidizing the surface of the soft magnetic backing layer, between the soft magnetic backing layer and the soft magnetic underlayer, and a crystalline orientation control layer between the soft magnetic underlayer and the perpendicular magnetic recording layer.

In this perpendicular magnetic recording medium according to the second aspect, it is possible to reduce the size of the magnetic grains in the perpendicular magnetic recording layer and reduce the medium noise.

A perpendicular magnetic recording medium according to the third aspect is a perpendicular magnetic recording medium in which a nonmagnetic substrate, soft magnetic backing layer, soft magnetic underlayer, and perpendicular magnetic recording layer are stacked in this order, and which further includes an orientation control layer mainly containing Ni between the soft magnetic underlayer and the perpendicular magnetic recording layer.

In this perpendicular magnetic recording medium according to the third aspect, it is possible to reduce the size of the magnetic grains in the perpendicular magnetic recording layer and reduce the medium noise.

In each of the first to third aspects as described above, a perpendicular magnetic recording medium suited to high-density recording can be obtained by promoting reducing of the size of magnetic grains in the perpendicular magnetic recording layer and reducing the medium noise, without increasing the magnetic spacing between a recording head and the soft magnetic backing layer.

The present invention will be described in more detail below with reference to the accompanying drawing.

FIG. 1 is a schematic sectional view showing an example of the structure of the perpendicular magnetic recording medium according to the first aspect.

As shown in FIG. 1, a magnetic recording medium 10 has a structure in which a soft magnetic backing layer 2, an oxidized layer 3 formed by oxidizing the surface of the soft magnetic backing layer, a soft magnetic underlayer 7, and a perpendicular magnetic recording layer 8 are stacked in this order on a nonmagnetic substrate 1. The soft magnetic underlayer 7 has a three-layered structure including a first soft magnetic layer 4, interlayer 5, and second soft magnetic layer 6 in this order from the nonmagnetic substrate side.

Figure 2:
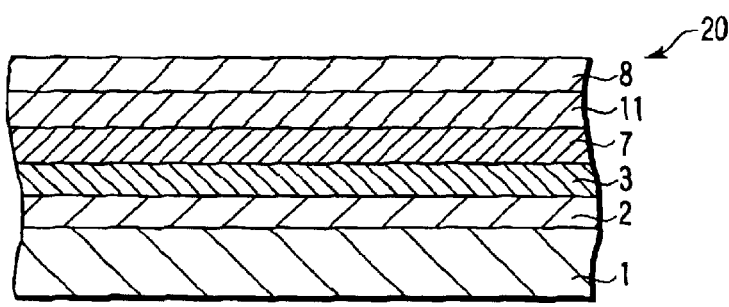
FIG. 2 is a schematic sectional view showing an example of the structure of a perpendicular magnetic recording medium according to the second aspect.

FIG. 2 is a schematic sectional view showing an example of the structure of the perpendicular magnetic recording medium according to the second aspect.

As shown in FIG. 2, a magnetic recording medium 20 has a structure in which a soft magnetic backing layer 2, an oxidized layer 3 formed by oxidizing the surface of the soft magnetic backing layer, a soft magnetic underlayer 7, a crystalline orientation control layer 11, and a perpendicular magnetic recording layer 8 are stacked in this order on a nonmagnetic substrate 1.

Figure 3:
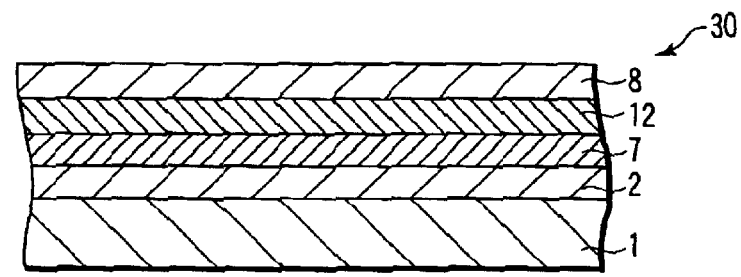
FIG. 3 is a schematic sectional view showing an example of the structure of a perpendicular magnetic recording medium according to the third aspect.

FIG. 3 is a schematic sectional view showing an example of the structure of the perpendicular magnetic recording medium according to the third aspect.

As shown in FIG. 3, a magnetic recording medium 30 has a structure in which a soft magnetic backing layer 2, soft magnetic underlayer 7, Ni orientation control layer 12, and perpendicular magnetic recording layer 8 are stacked in this order on a nonmagnetic substrate 1.

As the nonmagnetic substrate, it is possible to use, e.g., a glass substrate, an Al-based alloy substrate, ceramic, carbon, an Si single-crystal substrate having an oxidized surface, or a substrate obtained by plating any of these substrates with NiP or the like.

Examples of the glass substrate are amorphous glass and crystallized glass. As the amorphous glass, commercially available soda-lime glass or aluminosilicate glass can be used. As the crystallized glass, lithium-based crystallized glass can be used. As the ceramic substrate, it is possible to use a sintered material mainly containing general-purpose aluminum oxide, aluminum nitride, or silicon nitride, or a fiber reinforced material of this sintered material.

As a soft magnetic material used in the soft magnetic backing layer, soft magnetic underlayer, and first and second soft magnetic layers, it is possible to use a material containing, e.g., Fe, Ni, and Co. Examples are FeCo-based alloys such as FeCo and FeCoV, FeNi-based alloys such as FeNi, FeNiMo, FeNiCr, and FeNiSi, FeAl-based and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN.

It is also possible to use a material having a microcrystalline structure, such as FeAlO, FeMgO, FeTaN, or FeZrN, which contains 60 at % or more of Fe, or a material having a granular structure in which fine crystal grains are dispersed in a matrix.

In addition to the above materials, a Co alloy containing 80 at % or more of Co and containing at least one of Zr, Hf, Nb, Ta, Ti, and Y can also be used as the soft magnetic material. When film formation is performed using this Co alloy by sputtering, an amorphous layer is readily formed. An amorphous soft magnetic material has very high soft magnetism because the material has none of crystal magnetic anisotropy, crystal defects, and grain boundaries. Preferred examples of this material are CoZr-based, CoZrNb-based, and CoZrTa-based alloys.

The oxidized layer 3 can be formed by, e.g., exposing the formed soft magnetic backing layer to an oxygen-containing ambient, or supplying oxygen during the process of forming a portion near the surface of the soft magnetic backing layer. More specifically, when the surface of the soft magnetic backing layer is to be exposed to oxygen, the layer need only be held for about 0.3 to 20 sec in oxygen or in a gas ambient in which oxygen is diluted with a gas such as argon or nitrogen. The oxidized layer 3 may also be formed by exposure to the atmosphere.

Especially when a gas obtained by diluting oxygen with a gas such as argon or nitrogen is used, the degree of oxidation of the soft magnetic backing layer surface can be easily adjusted, so stable manufacture is possible. When sputtering is used in the method by which oxygen is supplied to a gas for forming a soft magnetic backing layer, this sputtering can be performed by using a process gas to which oxygen is supplied only during a portion of the film formation time.

The crystalline orientation control layer may also be formed between the second soft magnetic layer and perpendicular magnetic recording layer of the perpendicular magnetic recording medium according to the first aspect.

Figure 4:
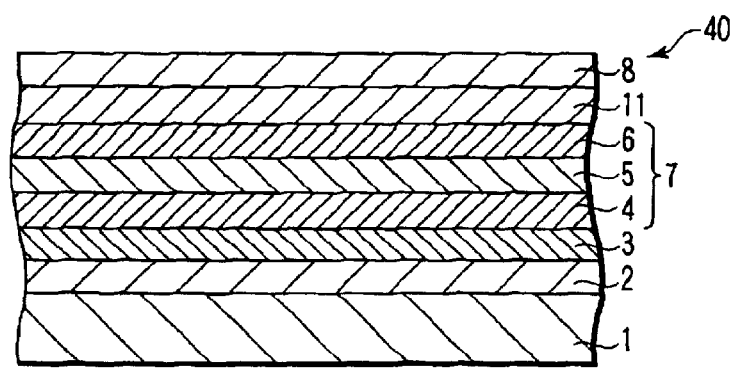
FIG. 4 is a schematic sectional view showing another example of the structure of the perpendicular magnetic recording medium according to the first aspect.

FIG. 4 is a schematic sectional view showing an example of the structure of the perpendicular magnetic recording medium according to the first aspect in which the crystalline orientation control layer is formed.

As shown in FIG. 4, a perpendicular magnetic recording medium 40 has the same structure as shown in FIG. 1 except that a crystalline orientation control layer 11 is formed between a second soft magnetic layer 6 and a perpendicular magnetic recording layer 8.

The orientation control layer usable in the perpendicular magnetic recording media according to the first and second aspects can mainly contain Ni.

The orientation control layer mainly containing Ni usable in the present invention can further contain at least one element selected from the group consisting of Ta, Nb, C, and Co.

In addition, this orientation control layer can be substantially made of NiTa or NiNb.

Saturation magnetization Ms of the orientation control layer can be 200 emu/cc or less. If the Ms of the orientation control layer exceeds 200 emu/cc, the recording/reproduction characteristics tend to worsen by noise generated from the orientation control layer.

The thickness of the orientation control layer can be 1 to 20 nm (particularly, 1 to 12 nm). When the thickness of the orientation control layer falls within this range, the perpendicular orientation of the perpendicular magnetic recording layer is particularly high, and the distance between a magnetic head and the soft magnetic backing layer can be decreased during recording. Accordingly, the recording/reproduction characteristics can be improved without lowering the resolution of a reproduction signal.

The orientation control layer can have a microcrystalline structure. This is so because the grain size of the perpendicular magnetic recording layer can be decreased by the microcrystalline structure.

The soft magnetic underlayer usable in the perpendicular magnetic recording media according to the second and third aspects can have a three-layered structure including a first soft magnetic layer, an interlayer formed on the first soft magnetic layer, and a second soft magnetic layer formed on the interlayer.

When the soft magnetic underlayer is given this three-layered structure, it is possible to decrease the grain size of magnetic grains in the perpendicular magnetic recording layer, and reduce the medium noise.

A schematic sectional view showing an example of the structure of the perpendicular magnetic recording medium according to the second aspect in which the soft magnetic underlayer is changed to this three-layered structure is the same as FIG. 4.

Figure 5:
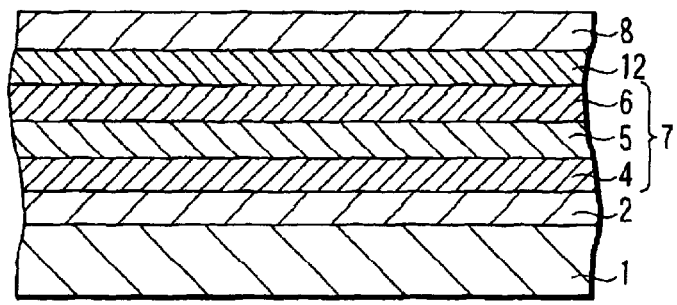
FIG. 5 is a schematic sectional view showing another example of the structure of the perpendicular magnetic recording medium according to the third aspect.

FIG. 5 is a schematic sectional view showing an example of the structure of the perpendicular magnetic recording medium according to the third aspect in which the soft magnetic underlayer is changed to this three-layered structure.

As shown in FIG. 5, a perpendicular magnetic recording medium 50 has the same structure as shown in FIG. 3 except that a soft magnetic underlayer 7 has a three-layered structure including a first soft magnetic layer 4, interlayer 5, and second soft magnetic layer 6 in this order from the nonmagnetic substrate side.

The soft magnetic backing layer, soft magnetic underlayer, and first and second soft magnetic layers used in the present invention mainly contain Co and can further contain at least one element selected from the group consisting of Zr, Hf, Nb, Ta, Ti, and Y.

An amorphous layer is readily formed especially when a soft magnetic layer made of Co and at least one of Zr, Hf, Nb, Ta, Ti, and Y is formed by sputtering. An amorphous soft magnetic material has no crystalline magnetic anisotropy, crystal defects, and grain boundaries, and hence effectively shows excellent soft magnetic characteristics.

The soft magnetic backing layer, soft magnetic underlayer, and first and second soft magnetic layers used in the present invention can be substantially made of CoZrNb or CoTaZr.

CoZrNb or CoTaZr is particularly excellent in soft magnetic characteristics.

Furthermore, the soft magnetic backing layer and first soft magnetic layer can be substantially made of be CoZrNb, and the soft magnetic underlayer and second soft magnetic layer can be substantially made of CoTaZr.

Forming CoZrNb as a lower layer and CoTaZr as an upper layer with respect to the substrate has the advantage that it is possible to further decrease the grain size of magnetic grains in the perpendicular magnetic recording layer and further reduce the medium noise.

The soft magnetic underlayer can have a thickness of 20 nm or less, particularly, a thickness of 5 to 10 nm. If this thickness exceeds 20 nm, the medium noise gradually increases.

Each of the first and second soft magnetic layers can have a thickness of 20 nm or less, particularly, a thickness of 5 to 10 nm. If this thickness exceeds 20 nm, the medium noise gradually increases.

The interlayer can be substantially made of a nonmagnetic material or an antiferromagnetic material.

The saturation magnetization of the interlayer can be 200 emu/cc or less. If the Ms of the interlayer exceeds 200 emu/cc, the recording/reproduction characteristics tend to worsen by noise generated from the interlayer.

As the interlayer, at least one element selected from the group consisting of Ru, CoCr, Cr, and FeMn can be used. When any of these materials is used as the interlayer, the grain size of magnetic grains in the perpendicular magnetic recording layer can be decreased, so the effect of reducing the medium noise can be obtained.

The interlayer can have a thickness of 20 nm or less, particularly, a thickness of 2 to 5 nm. If this thickness exceeds 20 nm, the medium noise tends to increase gradually.

Heating can be performed when the soft magnetic underlayer and first and second soft magnetic layers are sputtered. The heating temperature can be 100 to 500° C., particularly, 200 to 400° C. If the heating temperature is less than 100° C., the soft magnetic layer does not crystallize, so the medium noise is not reduced. If the heating temperature exceeds 500° C., the substrate deforms and becomes unusable as a magnetic recording medium.

The perpendicular magnetic recording medium used in the present invention can mainly contain Co, Cr, and Pt. The Cr content can be 14 to 24 at %, particularly, 16 to 22 at %. The Pt content can be 10 to 24 at %, particularly, 14 to 20 at %.

0.1 to 5 at % of B can also be added. This makes it possible to reduce the exchange coupling between magnetic grains, and improve the recording/reproduction characteristics.

If the Cr content is less than 14 at %, the exchange coupling between magnetic grains tends to increase, and this increases the medium noise. If the Cr content exceeds 24 at %, the coercive force and perpendicular squareness ratio lower.

If the Pt content is less than 10 at %, the effect of improving the recording/reproduction characteristics tends to become unsatisfactory. In addition, the perpendicular squareness ratio tends to lower, and the thermal decay resistance tends to worsen. If the Pt content exceeds 24 at %, the medium noise tends to increase.

In addition to B, any arbitrary elements can be added to the CoCrPt-based alloy. Although these elements are not particularly limited, examples are Ta, Mo, Nb, Hf, Ir, Cu, Ru, Nd, Zr, W, and Nd.

As the perpendicular magnetic recording layer, it is also possible to use a CoCr-based alloy, a CoPt-based alloy, CoPtO, CoPtCrO, CoPtB, or CoPtCrB; a multilayered structure of Co and an alloy mainly containing at least one element selected from the group consisting of Pt, Pd, Rh, and Ru; or CoCr/PtCr, CoB/PdB, or CoO/RhO obtained by adding Cr, B, or O to the above multilayered structure.

The thickness of the perpendicular magnetic recording layer can be 5 to 60 nm, particularly, 10 to 40 nm. If the thickness of the perpendicular magnetic recording layer is 5 nm or more, the reproduction output is not too low and hence is not buried in noise components. If the thickness of the perpendicular magnetic recording layer is 40 nm or less, the reproduction output is not too high and hence does not distort the waveform. This allows the perpendicular magnetic recording medium to easily operate as a magnetic recording/reproduction apparatus more suitable for high recording density.

The coercive force of the perpendicular magnetic recording layer can be 3,000 (Oe) or more. If the coercive force is less than 3,000 (Oe), the thermal decay resistance tends to deteriorate.

The perpendicular squareness ratio of the perpendicular magnetic recording layer can be 0.8 or more. If the perpendicular squareness ratio is less than 0.8, the thermal decay resistance tends to deteriorate.

The average grain size of crystal grains in the perpendicular magnetic recording layer can be 5 to 15 nm. This average grain size can be obtained by, e.g., observing crystal grains in the perpendicular magnetic recording layer with a transmission electron microscope (TEM), and processing the observed image.

Any conventionally known material can be used as a protective layer in order to prevent corrosion of the perpendicular magnetic recording layer, and prevent damage to the medium surface when a magnetic head comes in contact with the medium. Examples are materials containing C, $SiO_2$, and $ZrO_2$. The thickness of the protective layer is desirably 1 to 10 nm for the sake of high recording density, since the distance between the head and the medium can be decreased.

As a lubricant, it is possible to use any conventionally known material, e.g., perfluoropolyether, alcohol fluoride, or fluorinated carboxylic acid.

A longitudinal hard magnetic layer, e.g., a Co-containing longitudinal hard magnetic layer, can also be formed between the nonmagnetic substrate and the soft magnetic backing layer. A CoCrPt alloy or CoSm alloy can be used as this longitudinal hard magnetic layer. The coercive force of the longitudinal hard magnetic layer can be 500 (Oe) or more particularly, 1,000 (Oe) or more. The thickness of the longitudinal hard magnetic layer can be 150 nm or less, particularly, 70 nm or less. To control the crystal orientation in the longitudinal hard magnetic layer, a Cr alloy material or $B_2$ structure material can be used between the nonmagnetic substrate and the longitudinal hard magnetic layer.

Figure 6:
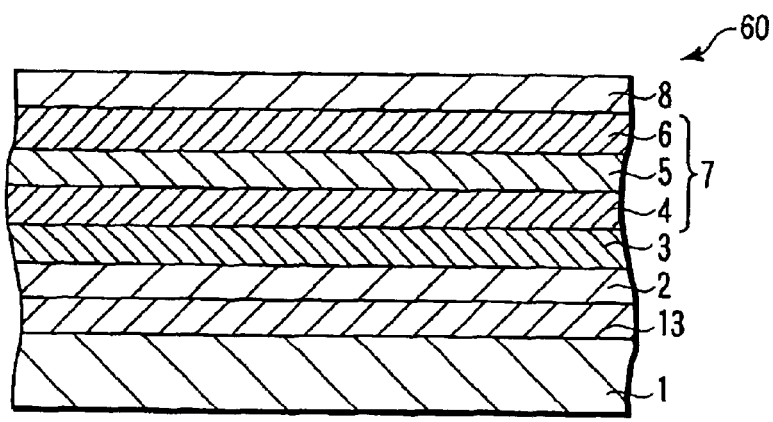
FIG. 6 is a schematic sectional view showing still another example of the structure of the perpendicular magnetic recording medium according to the first aspect.
Figure 7:
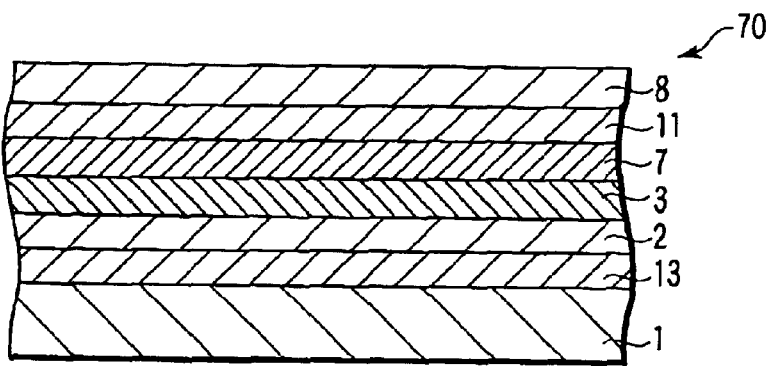
FIG. 7 is a schematic sectional view showing another example of the structure of the perpendicular magnetic recording medium according to the second aspect.
Figure 8:
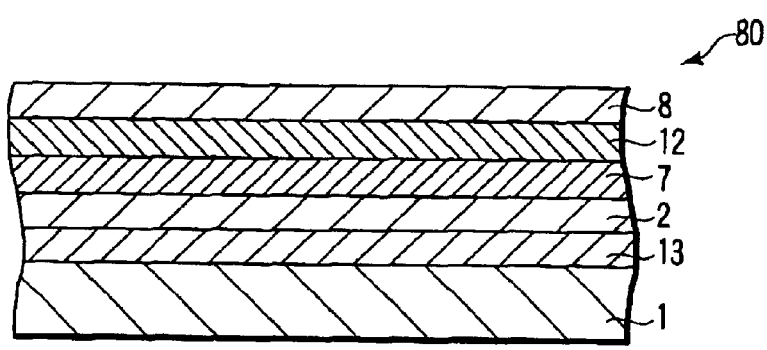
FIG. 8 is a schematic sectional view showing still another example of the structure of the perpendicular magnetic recording medium according to the third aspect.

FIGS. 6, 7, and 8 are schematic sectional views showing examples of the structures of the perpendicular magnetic recording media according to the first, second, and third aspects, respectively, in each of which the longitudinal hard magnetic layer is further formed between the nonmagnetic substrate and the soft magnetic backing layer.

As shown in FIGS. 6, 7, and 8, perpendicular magnetic recording media 60, 70, and 80 have the same structures as shown in FIGS. 1, 2, and 3, respectively, except that a Co-containing longitudinal hard magnetic layer 13 is further formed between a nonmagnetic substrate 1 and a soft magnetic backing layer 2.

By forming a soft magnetic backing layer on the longitudinal hard magnetic layer and magnetizing the soft magnetic backing layer in a desired direction, e.g., the disk radial direction, the easy axis of magnetization of the soft magnetic backing layer can be fixed.

An alloy layer mainly containing CoCr can be further formed between the soft magnetic underlayer and the perpendicular magnetic recording layer. It is more favorable to use an alloy containing Pt, B, or Ta. The Co content of this alloy layer is 30 to 70 at %, and the alloy layer can have an HCP (Hexagonal Closest Packed) structure. The thickness of this alloy layer can be 30 nm or less, particularly, 20 nm or less, in order to prevent deterioration of the recording/reproduction characteristics caused by an increase in magnetic grain size in the perpendicular magnetic recording layer, or to prevent a decrease in recording resolution caused by an increase in distance between the magnetic head and the soft magnetic underlayer 2. When this alloy layer mainly containing CoCr is formed, the perpendicular orientation of the perpendicular magnetic recording layer can be improved. This makes it possible to further improve the magnetic characteristics such as the coercive force and perpendicular squareness ratio, improve the recording/reproduction characteristics such as the medium noise and recording resolution, and increase the thermal decay resistance.

Note that this CoCr alloy layer can be formed anywhere between the soft magnetic underlayer and the perpendicular magnetic recording layer, e.g., between the soft magnetic underlayer and the orientation control layer., or between the orientation control layer and the perpendicular magnetic recording layer.

Figure 9:
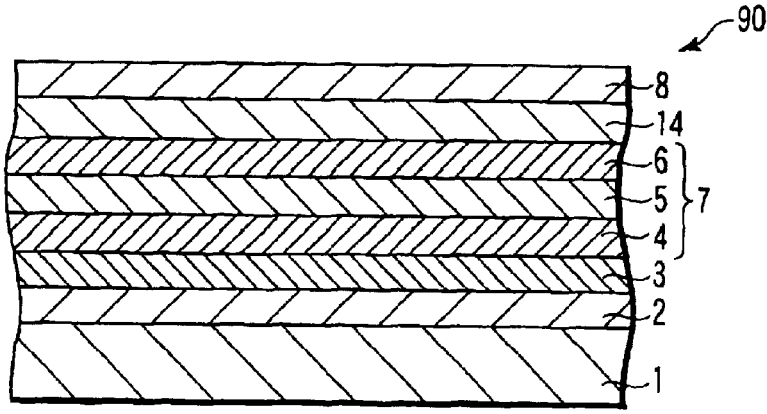
FIG. 9 is a schematic sectional view showing still another example of the structure of the perpendicular magnetic recording medium according to the first aspect.
Figure 10:
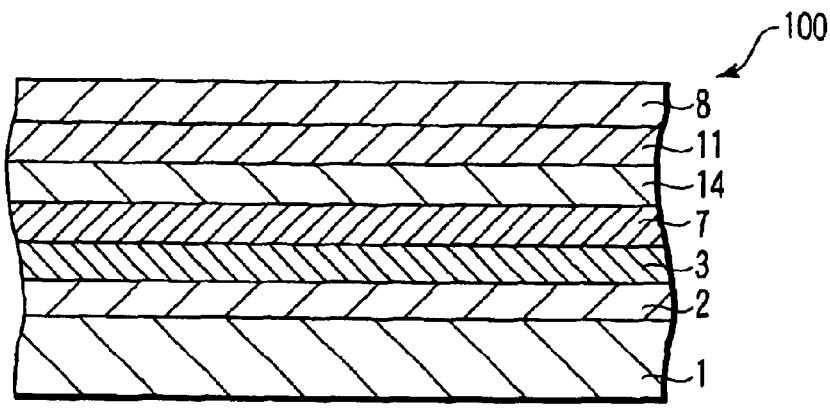
FIG. 10 is a schematic sectional view showing still another example of the structure of the perpendicular magnetic recording medium according to the second aspect.
Figure 11:
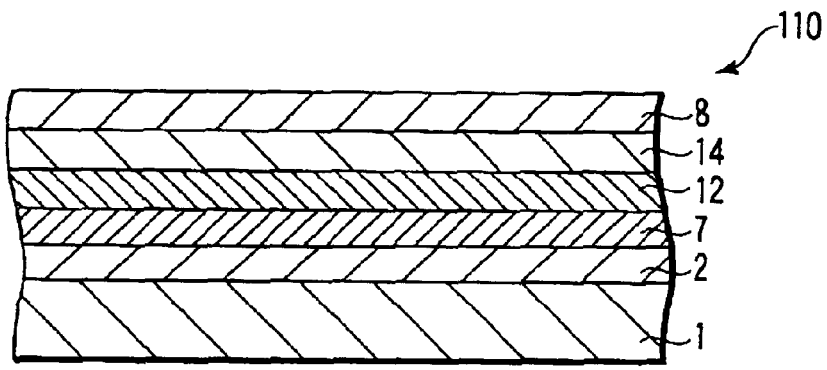
FIG. 11 is a schematic sectional view showing still another example of the structure of the perpendicular magnetic recording medium according to the third aspect.

FIGS. 9 to 11 are schematic sectional views showing examples of the structures of perpendicular magnetic recording media in each of which the CoCr alloy layer is formed between the soft magnetic underlayer and the perpendicular magnetic recording layer.

As shown in FIG. 9, a perpendicular magnetic recording medium 90 has the same structure as the perpendicular magnetic recording medium shown in FIG. 1 except that a CoCr alloy layer 14 is formed between a second soft magnetic layer 6 and a perpendicular magnetic recording layer 8.

As shown in FIG. 10, a perpendicular magnetic recording medium 100 has the same structure as the perpendicular magnetic recording medium shown in FIG. 2 except that a CoCr alloy layer 14 is formed between a second soft magnetic layer 7 and a crystalline orientation control layer 11.

As shown in FIG. 11, a perpendicular magnetic recording medium 110 has the same structure as the perpendicular magnetic recording medium shown in FIG. 3 except that a CoCr alloy layer 14 is formed between an Ni orientation control layer 12 and a perpendicular magnetic recording layer 8.

According to the fourth, fifth, and sixth aspects of the present invention, there are provided magnetic recording/reproduction apparatuses comprising the magnetic recording media according to the first, second, and third aspects, respectively. Each magnetic recording/reproduction apparatus further comprises a driving mechanism which supports and rotates the magnetic recording medium, a magnetic head having an element to record information on the perpendicular magnetic recording medium and an element to reproduce the recorded information, and a carriage assembly which supports the magnetic head such that the magnetic head is movable with respect to the magnetic recording medium.

According to each of the fourth to sixth aspects, a magnetic recording/reproduction apparatus capable of high density recording can be obtained by promoting reducing of the size of magnetic grains in the perpendicular magnetic recording layer and reducing the medium noise, without increasing the magnetic spacing between the recording head and the soft magnetic backing layer.

Figure 12:
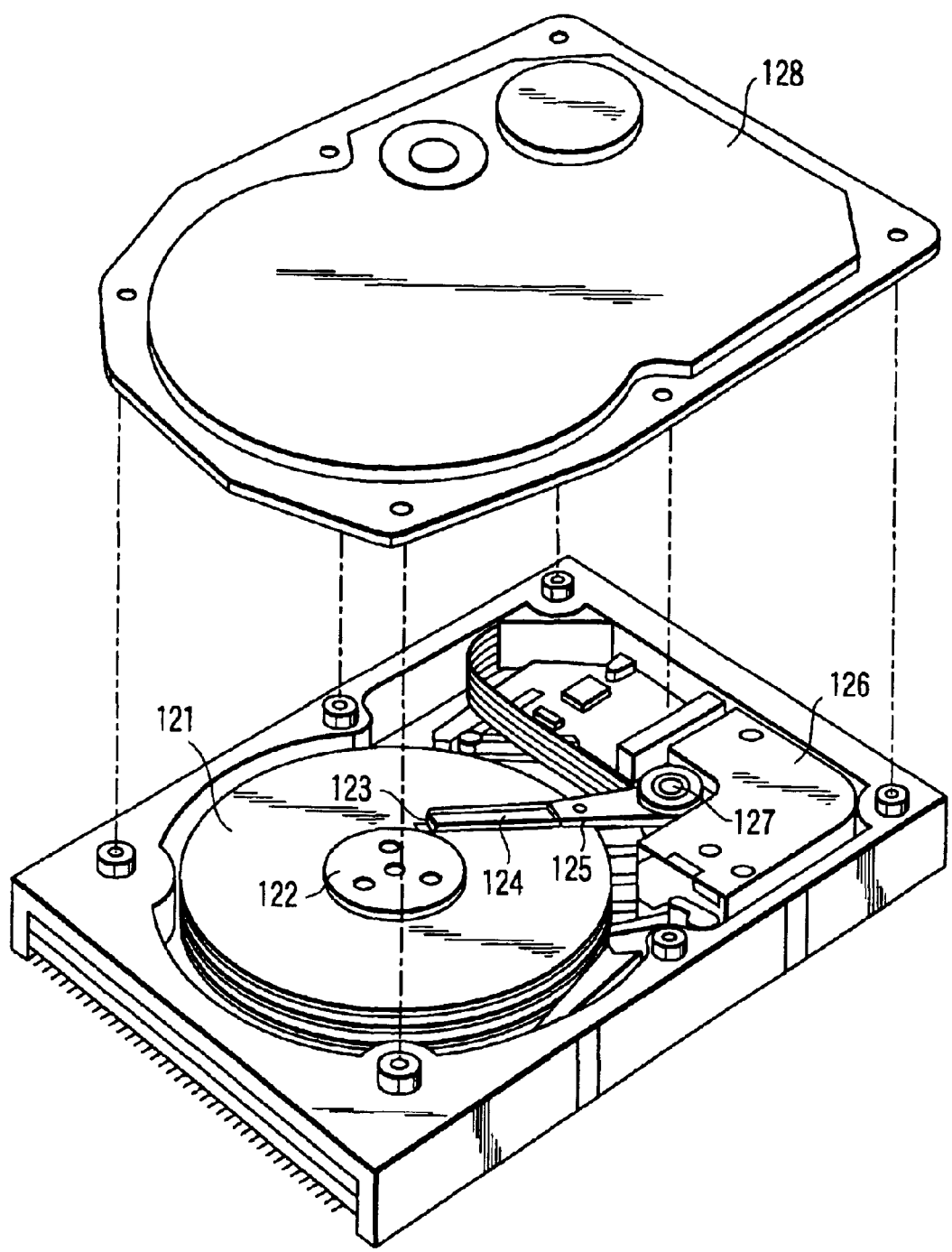
FIG. 12 is a partially exploded perspective view showing an example of a magnetic recording/reproduction apparatus according to the present invention.

FIG. 12 is a partially exploded perspective view showing an example of the magnetic recording/reproduction apparatus according to the present invention.

A rigid magnetic disk 121 for recording information according to the present invention is fitted on a spindle 122 and rotated at a predetermined rotational speed by a spindle motor (not shown). A slider 123 mounting a single pole recording head for accessing the magnetic disk 121 to record information and an MR head for reproducing information is attached to the end portion of a suspension 124 which is a thin leaf spring. This suspension 124 is connected to one end of an arm 125 having, e.g., a bobbin which holds a driving coil (not shown).

A voice coil motor 126 as a kind of a linear motor is attached to the other end of the arm 125. This voice coil motor 126 includes the driving coil (not shown) wound around the bobbin of the arm 125, and a magnetic circuit having a permanent magnetic and counter yoke opposing each other on the two sides of the driving coil.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 12 denotes a lid.

The present invention will be described in more detail below by way of its examples.

EXAMPLE 1

As a nonmagnetic substrate, a cleaned glass substrate (manufactured by OHARA INC., outside diameter=2.5 in) was prepared.

This glass substrate was placed in a film formation chamber of a DC magnetron sputtering apparatus (C-3010 manufactured by ANELVA CORP.) The film formation chamber was evacuated to an ultimate vacuum degree of $2 \times 10^{-5}$ Pa and heated to 200° C., and sputtering was performed in an Ar ambient at a gas pressure of 0.6 Pa.

First, a 40-nm thick CrMo alloy layer was formed as a nonmagnetic underlayer on the nonmagnetic substrate.

On top of this nonmagnetic underlayer, a 40-nm thick Co-22 at. % Cr-13 at. % Pt hard magnetic layer was stacked to form a longitudinally aligned hard magnetic layer.

On this hard magnetic layer, a 150-nm thick Co-5 at. % Zr-8 at. % Nb alloy layer was formed as a soft magnetic backing layer. The resultant medium was once taken out from the vacuum chamber to the atmosphere to oxidize the surface layer of the soft magnetic backing layer.

The medium cooled in the atmosphere was returned to the vacuum chamber and heated to 250° C., and DC magnetron sputtering was performed in the Ar ambient at a gas pressure of 0.6 Pa. First, a 10-nm thick CoZrNb alloy layer was formed as a first soft magnetic layer. A 5-nm thick Co-40 at. % Cr alloy layer was then formed as an interlayer. After that, a 10-nm thick CoZrNb alloy layer was formed as a second soft magnetic layer, thereby obtaining a soft magnetic underlayer having a three-layered structure. In addition, a 5-nm thick Ni-40 at. % Ta orientation control layer was formed on the second soft magnetic layer, and a 15-nm thick nonmagnetic layer made of a Co-37 at. % Cr-8 at. % Pt alloy was also formed. After that, a 20-nm thick Co-20 at. % Cr-10 at. % Pt-1 at. % B alloy layer was formed as a perpendicular magnetic recording layer. Finally, a 5-nm thick C layer was formed on the obtained perpendicular magnetic recording layer, and a perfluoropolyether lubricating film was formed by dipping, thereby obtaining a perpendicular magnetic recording medium.

Figure 13:
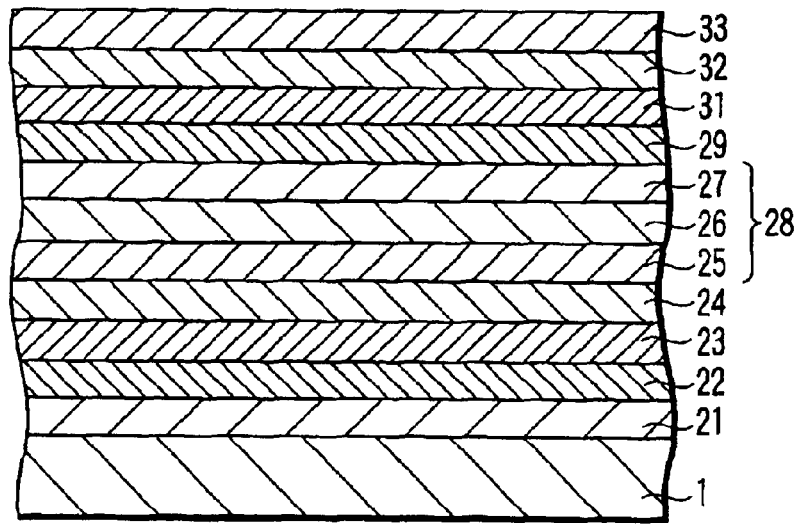
FIG. 13 is a schematic sectional view showing the structure of a perpendicular magnetic recording medium according to Example 1.

FIG. 13 is a schematic sectional view showing the structure of the perpendicular magnetic recording medium.

As shown in FIG. 13, a perpendicular magnetic recording medium 120 has a structure in which a CrMo alloy layer 21, a Co-22 at. % Cr-13 at. % Pt hard magnetic layer 22, a Co-5 at. % Zr-8 at. % Nb alloy soft magnetic backing layer 23, an oxidized layer 24 of the soft magnetic backing layer 23, a soft magnetic underlayer 28 having a three-layered structure including a first soft magnetic layer 25 made of a CoZrNb alloy, an interlayer 26 made of a Co-40 at. % Cr alloy, and a second soft magnetic layer 27 made of a CoZrNb alloy, an Ni-40 at. % Ta orientation control layer 29, a Co-37 at. % Cr-8 at. % Pt nonmagnetic layer 31, a perpendicular magnetic recording layer 32 made of a Co-20 at. % Cr-10 at. % Pt-1 at. % B alloy, a C protective layer 33, and a lubricating layer (not shown) are stacked in this order on a substrate 1.

After the perpendicular magnetic recording medium thus continuously manufactured in the vacuum chamber was taken out into the atmosphere, a magnetizing apparatus having an exclusively formed electromagnet was used to apply a magnetic field of 15 kOe outward in the radial direction of the disk-like substrate, thereby magnetizing the CoCrPt longitudinal hard magnetic layer in the radial direction. All perpendicular magnetic recording media to be described below were thus magnetized unless otherwise specified.

The recording/reproduction characteristics of the thus manufactured perpendicular magnetic recording medium were evaluated by using a read/write analyzer 1632 and spin stand S1701MP available from Guzik Technical Enterprises of U.S.A. As a recording/reproduction head, a head using a single magnetic pole as a recording unit and a magnetoresistance effect as a reproducing element was used.

In the evaluation of a reproduction signal output/medium noise ratio (S/Nm), a value obtained at a linear recording density of 50 kFCI was used as a reproduction signal output S, and a value obtained at a linear recording density of 500 kFCI was used as S/Nm. As a consequence, no spike noise was observed on the entire disk surface, and the S/Nm was as high as 24.2 dB.

A hysteresis loop was evaluated by changing the sweep time from 300 to 15 sec by using a polar Kerr effect measurement apparatus. The magnitude of an activation magnetic moment (v·Isb) as a reversal unit of magnetization was calculated from a coercive force Hc in the hysteresis loop and the sweep time. As a consequence, $0.9 \times 10^{-15}$ emu, i.e., a small value was obtained. The S/Nm as described above was obtained presumably because the activation magnetic moment thus reduced, i.e., the size of magnetic grains in the magnetic recording layer decreased, and the magnetic interaction between the magnetic grains reduced.

Also, when the sectional structure of the medium was observed with a transmission electron microscope (TEM), a thin white film was observed between the CoZrNb soft magnetic backing layer and the first soft magnetic layer. This indicates that an oxidized layer was formed in the surface layer of the CoZrNb soft magnetic backing layer since the medium was exposed to the atmosphere during the process.

Furthermore, the crystal structure of the NiTa orientation control layer was evaluated by a TEM diffraction image.

Consequently, although Ni was the main component, a ring not found in an FCC (Face-Centered Cubic structure) was observed. Therefore, the structure of this NiTa layer was presumably an HCP (Hexagonal Closest Packed structure).

When a medium was formed by using amorphous C instead of the NiTa orientation control layer, the magnetic characteristics and recording/reproduction characteristics obviously deteriorated. Therefore, perhaps the crystal structure of the NiTa layer greatly helps improve the crystal orientation and grain size of the CoCrPtB recording layer.

When no heating was performed, the S/Nm of the soft magnetic underlayer having the three-layered structure did not improve. Accordingly, not only the CoCr interlayer which is originally crystalline but also the CoZrNb soft magnetic layer which easily turns into amorphous probably crystallize by heating and affect the grain size of the NiTa layer. This possibly allows the NiTa orientation control layer to be crystalline.

Even when a crystalline nonmagnetic CoCrPt layer was stacked on the soft magnetic underlayer having the three-layered structure without forming any NiTa orientation control layer, a high S/Nm was obtained although the value was not as high as that when the NiTa layer was formed.

The dependence of the CoCr interlayer upon the saturation magnetization Ms was checked by changing the composition. Consequently, the S/Nm worsened when the Ms exceeded 200 emu/cc. Therefore, perhaps the saturation magnetization Ms of the interlayer can be set to 200 emu/cc or less.

COMPARATIVE EXAMPLE 1

A perpendicular magnetic recording medium was obtained following the same procedure as in Example 1 except that no soft magnetic underlayer 28 having a three-layered structure including a CoZrNb layer 25, CoCr layer 26, and CoZrNb layer 27 was formed.

The obtained perpendicular magnetic recording medium was evaluated in the same manner as in Example 1. Consequently, the S/Nm at a linear recording density of 500 kFCI was 22.2 dB, i.e., the S/Nm in Example 1 was higher.

Also, when the activation magnetic moment was evaluated, the value of v·Isb was $1.1 \times 10^{-15}$ emu, i.e., larger than that in Example 1. Accordingly, the S/Nm deteriorated probably because the magnetization reversal unit increased, i.e., the grain size in the recording layer increased.

The S/Nm further lowered when a medium was formed following the same procedure as in Example 1 except that no soft magnetic underlayer 28 having a three-layered structure including a CoZrNb layer 25, CoCr layer 26, and CoZrNb layer 27 was formed, and no NiTa orientation-control layer 29 was formed. The S/Nm was higher when no NiTa orientation control layer 29 was formed in Example 1.

From the foregoing, it is possible to reduce the size of the magnetic grains in the magnetic recording layer and reduce the medium noise by forming the soft magnetic underlayer having the three-layered structure between the soft magnetic backing layer and the orientation control layer.

EXAMPLE 2

A perpendicular magnetic recording medium was formed following the same procedure as in Example 1 except that a 10-nm thick Co-5 at. % Ta-5 at. % Zr soft magnetic underlayer was formed instead of the soft magnetic underlayer 28 having the three-layered structure including the CoZrNb layer 25, CoCr layer 26, and CoZrNb layer 27.

The recording/reproduction characteristics of the obtained perpendicular magnetic recording medium were evaluated. Consequently, the S/Nm at a linear recording density of 500 kFCI was 24.0 dB, i.e., as high as that in Example 1.

Also, when the activation magnetic moment was evaluated, the value of v·Isb was $0.9 \times 10^{-15}$ emu, i.e., as small as that in Example 1.

From the foregoing, even when the single-layered CoTaZr soft magnetic underlayer is formed between the soft magnetic backing layer and the orientation control layer, the effect of reducing magnetic grain size in the magnetic recording layer and reducing the medium noise can be obtained.

EXAMPLE 3

A perpendicular magnetic recording medium was formed following the same procedure as in Example 1 except that no oxidized layer 24 was formed by exposing a CoZrNb soft magnetic backing layer 23 to the atmosphere.

The recording/reproduction characteristics of the obtained perpendicular magnetic recording medium were evaluated. As a consequence, the S/Nm at 500 kFCI was as high as 23.4 dB.

Also, when the sectional structure of the medium was observed with a transmission electron microscope (TEM), no thin white film was observed between the CoZrNb soft magnetic backing layer 23 and a first soft magnetic layer 28. That is, no oxidized layer was formed because the CoZrNb soft magnetic backing layer 23 was not exposed to the atmosphere.

Furthermore, the crystal structure of an NiTa orientation control layer was evaluated by a TEM diffraction image. Consequently, although Ni was the main component, a ring not found in an FCC (Face-Centered Cubic structure) was observed. Therefore, perhaps the structure of this NiTa layer was an HCP (Hexagonal Closest Packed structure).

When an amorphous C layer was formed instead of the NiTa orientation control layer, the magnetic characteristics and recording/reproduction characteristics obviously deteriorated. Even when no oxidized layer is formed, therefore, perhaps the crystal structure of the NiTa layer greatly helps improve the crystal orientation of the magnetic recording layer and decrease the grain size of the layer. When no heating was performed, the S/Nm of the soft magnetic underlayer 28 having the three-layered structure did not improve. Accordingly, not only the CoCr interlayer which is originally crystalline but also the CoZrNb soft magnetic layer which easily turns into amorphous probably crystallize by heating and affect the crystal grain size of the NiTa orientation control layer. This also shows that it is presumably important that the NiTa orientation control layer be crystalline.

COMPARATIVE EXAMPLE 2

A perpendicular magnetic recording medium was obtained following the same procedure as in Example 3 except that no soft magnetic underlayer 28 having a three-layered structure including a CoZrNb layer 25, CoCr layer 26, and CoZrNb layer 27 was formed.

The recording/reproduction characteristics of the obtained perpendicular magnetic recording medium were evaluated. Consequently, the S/Nm at a linear recording density of 500 kFCI was 22.0 dB, i.e., the S/Nm in Example 3 was higher.

EXAMPLE 4

A perpendicular magnetic recording medium was formed following the same procedure as in Example 1 except that a 10-nm thick Co-5 at. % Ta-5 at. % Zr soft magnetic underlayer was formed instead of the soft magnetic underlayer 28 having the three-layered structure including the CorNb layer 25, CoCr layer 26, and CoZrNb layer 27.

The obtained perpendicular magnetic recording medium was evaluated in the same manner as in Example 3. Consequently, the S/Nm at a linear recording density of 500 kFCI was 23.2 dB, i.e., as high as that in Example 3.

From the foregoing, even when no oxidized layer 24 is formed, the effect of reducing magnetic grain size in the magnetic recording layer and reducing the medium noise can be obtained by forming a single-layered CoTaZr soft magnetic underlayer between the soft magnetic backing layer and the orientation control layer.

Example 5

Perpendicular magnetic recording media were obtained following the same procedures as in Examples 1 to 4 except that the soft magnetic backing layer 23 was changed to a Co-5 at. % Ta-5 at. % Zr alloy layer.

The obtained perpendicular magnetic recording media were evaluated in the same manner as above. As a consequence, the S/Nm at a linear recording density of 500 kFCI decreased only by 0.2 to 0.4 dB as a whole.

This shows that even when a CoTaZr alloy layer is used as a soft magnetic backing layer, the effect of reducing magnetic grain size in the magnetic recording layer and reducing the medium noise can be obtained.

Also, perpendicular magnetic recording media were obtained following the same procedures as in Examples 1 to 3 except that a CoTaZr alloy layer was formed as the second soft magnetic layer 27.

The obtained perpendicular magnetic recording media were evaluated in the same manner as above. As a consequence, the S/Nm at a linear recording density of 500 kFCI increased by 0.2 to 0.4 dB as a whole.

This shows that when a CoTaZr alloy layer is used as the second soft magnetic layer, the effect of reducing magnetic grain size in the magnetic recording layer and reducing the medium noise further improves.

Furthermore, perpendicular magnetic recording media were obtained following the same procedures as in Examples 2 and 4 except that a CoZrNb alloy layer, instead of the CoTaZr alloy layer, was formed as the soft magnetic underlayer.

The obtained perpendicular magnetic recording media were evaluated in the same manner as above. Consequently, the S/Nm at a linear recording density of 500 kFCI decreased only by 0.2 to 0.4 dB as a whole.

This indicates that even when a CoZrNb alloy layer is formed as a single-layered soft magnetic underlayer, the effect of reducing magnetic grain size in the magnetic recording layer and reducing the medium noise can be obtained.

In addition, various perpendicular magnetic recording media were formed by using soft magnetic layers each made of Co and one of Zr, Hf, Nb, Ta, Ti, and Y as the soft magnetic backing layer, first and second soft magnetic layers, and soft magnetic underlayer, and evaluated in the same manner as above. As a consequence, the same effect was obtained although the S/Nm varied by ±0.4 dB.

EXAMPLE 6

Various perpendicular magnetic recording media were formed following the same procedures as in Examples 1 to 4 and Comparative Examples 1 and 2 except that the thickness of the soft magnetic backing layer 23 was changed from 50 to 400 nm, and the thicknesses of the first soft magnetic layer 25, second soft magnetic layer 27, and single-layered soft magnetic underlayer were changed from 1 to 20 nm.

The obtained perpendicular magnetic recording media were evaluated in the same manner as above. As a consequence, the S/Nm of the soft magnetic backing layer increased as the thickness increased. On the other hand, the S/Nm of each of the first and second soft magnetic layers and single-layered soft magnetic underlayer gradually decreased, regardless of whether the thickness increased or decreased, from the maximum value when the thickness was 10 nm.

EXAMPLE 7

Various perpendicular magnetic recording media were formed following the same procedures as in Examples 1 to 3 except that Ru, Cr, or FeMn, instead of the CoCr alloy, was formed as the interlayer 26. Consequently, a high S/Nm equivalent to that of the perpendicular magnetic recording medium using the CoCr interlayer was obtained regardless of the type of interlayer.

Although the crystal structures of Ru and Cr were an HCP and BCC (Body-Centered Cubic structure), respectively, and FeMn was a compound, the same effect as CoCr was obtained. When, in addition to that, the structure of the NiTa layer, crystallization by heating, and the like are taken into consideration, the material of the interlayer is preferably crystalline, and the interlayer is presumably independent of its crystal structure.

Also, similar effects were obtained even though Ru and Cr were nonmagnetic and FeMn was antiferromagnetic. Therefore, the interlayer is probably independent of its magnetism as long as it is not ferromagnetic.

Furthermore, perpendicular magnetic recording media were formed following the same procedures as above except that the thickness of the four types of interlayers was changed from 1 to 10 nm.

The recording/reproduction characteristics of the obtained perpendicular magnetic recording media were evaluated. As a consequence, the S/Nm gradually decreased, regardless of whether the thickness of the interlayer was increased or decreased, from the maximum value when the thickness was 2 to 5 nm.

In addition, samples were formed following the same procedures as above except that the thickness of the four types of interlayers was changed from 0.2 to 20 nm and no perpendicular magnetic recording layer was formed. The hysteresis loop of each sample was measured by using a vibrating sample magnetometer (VSM). Consequently, even when the thickness was 20 nm by which the exchange coupling does not easily act, the first and second soft magnetic layers reversed not independently but together, and no phenomenon indicating division of the magnetic coupling was observed.

Note that even when Ru by which the exchanging coupling between the first and second soft magnetic layers are readily obtainable was used as the interlayer and the thickness was, e.g., 0.8 nm, neither antiferromagnetic coupling nor independent reversal of the first and second soft magnetic layers was observed.

EXAMPLE 8

Various perpendicular magnetic recording media were formed following the same procedures as in Examples 1 to 4 except that Ni-30 at. % Nb, instead of the NiTa layer, was formed as the orientation control layer.

The obtained perpendicular magnetic recording media were evaluated in the same manner as above. As a consequence, the S/Nm at a linear recording density of 500 kFCI was equivalent to that in each example.

This shows that even when the NiNb alloy is used as the orientation control layer, an effect of reducing magnetic grain size in the magnetic recording layer and reducing the medium noise can be obtained.

Furthermore, perpendicular magnetic recording media were similarly formed by using materials each obtained by combining Ni and Ta, Nb, C, or Co as the orientation control layer.

The obtained perpendicular magnetic recording media were similarly evaluated. Consequently, similar effects were obtained although the S/Nm changed by ±0.2 dB from that in each example.

EXAMPLE 9

Various perpendicular magnetic recording media were formed following the same procedures as in Examples 1 to 4 and Comparative Examples 1 and 2 except that no CoCrPt nonmagnetic layer 31 was formed.

The recording/reproduction characteristics of the obtained perpendicular magnetic recording media were evaluated in the same manner as above. As a consequence, similar effects were obtained even though the S/Nm decreased by only about 0.5 dB as a whole from that in each example.

EXAMPLE 10

Various perpendicular magnetic recording media were formed following the same procedures as in Examples 1 to 4 and Comparative Examples 1 and 2 except that neither the CrMo alloy layer 21 nor the CoCrPt hard magnetic layer 22 was formed.

The recording/reproduction characteristics of the obtained perpendicular magnetic recording media were evaluated in the same manner as above. As a consequence, a plurality of spike noise components of about the same magnitude as a reproduction signal were observed. This indicates that because no longitudinal hard magnetic layer was formed, the direction of the easy axis of magnetization of the soft magnetic backing layer was not fixed in the radial direction of the disk, so magnetic domain walls were formed. However, the S/Nm at a linear recording density of 500 kFCI was substantially equal to that in each example. This shows that the formation of a longitudinal hard magnetic layer has an effect of suppressing spike noise.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording medium comprising:

a nonmagnetic substrate;

a soft magnetic backing layer formed on the nonmagnetic substrate;

an oxidized layer formed by oxidizing a surface of the soft magnetic backing layer;

a soft magnetic underlayer having a three-layered structure including a first soft magnetic layer formed on the oxidized layer, an interlayer formed on the first soft magnetic layer, and a second soft magnetic layer formed on the interlayer, and a perpendicular magnetic recording layer formed on the second soft magnetic layer.

2. A medium according to claim 1, which further comprises an orientation control layer containing nickel between the second soft magnetic layer and the perpendicular magnetic recording layer.

3. A medium according to claim 2, wherein the orientation control layer further contains at least one element selected from the group consisting of tantalum, niobium, carbon, and cobalt.

4. A medium according to claim 1, wherein the soft magnetic backing layer and the first and second soft magnetic layers contain cobalt as a main component and further contain at least one element selected from the group consisting of zirconium, hafnium, niobium, tantalum, titanium, and yttrium.

5. A medium according to claim 1, wherein the interlayer is substantially made of a material selected from the group consisting of a nonmagnetic material and an antiferromagnetic material.

6. A medium according to claim 1, wherein the interlayer has a saturation magnetization of not more than 200 emu/cc.

7. A medium according to claim 1, wherein the interlayer is made of at least one material selected from the group consisting of ruthenium, a cobalt-chromium alloy, chromium, and an iron-manganese alloy.

8. A medium according to claim 1, wherein the perpendicular magnetic recording layer contains cobalt, chromium, and platinum as a main component.

9. A medium according to claim 1, which further comprises an alloy layer containing cobalt and chromium as a main component between the soft magnetic underlayer and the perpendicular magnetic recording layer.

10. A medium according to claim 1, which further comprises a longitudinal hard magnetic layer containing cobalt between the nonmagnetic substrate and the soft magnetic backing layer.

11. A perpendicular magnetic recording medium comprising:

a nonmagnetic substrate;

a soft magnetic backing layer formed on the nonmagnetic substrate;

an oxidized layer formed by oxidizing a surface of the soft magnetic backing layer;

a soft magnetic underlayer formed on the oxidized layer;

a crystalline orientation control layer containing nickel and formed on the soft magnetic underlayer; and a perpendicular magnetic recording layer formed on the orientation control layer.

12. A medium according to claim 11, wherein the orientation control layer further contains at least one element selected from the group consisting of tantalum, niobium, carbon, and cobalt.

13. A perpendicular magnetic recording medium comprising:

a nonmagnetic substrate;

a soft magnetic backing layer formed on the nonmagnetic substrate;

an oxidized layer formed by oxidizing a surface of the soft magnetic backing layer;

a soft magnetic underlayer formed on the oxidized layer;

a crystalline orientation control layer formed on the soft magnetic underlayer; and a perpendicular magnetic recording layer formed on the orientation control layer, wherein the soft magnetic backing layer and the soft magnetic underlayer contain cobalt as a main component and further contain at least one element selected from the group consisting of zirconium, hafnium, niobium, tantalum, titanium, and yttrium.

14. A medium according to claim 11, wherein the perpendicular magnetic recording layer contains cobalt, chromium, and platinum as a main component.

15. A medium according to claim 11, which further comprises an alloy layer containing cobalt and chromium as a main component between the soft magnetic underlayer and the perpendicular magnetic recording layer.

16. A medium according to claim 11, which further comprises a longitudinal hard magnetic layer containing cobalt between the nonmagnetic substrate and the soft magnetic backing layer.

17. A magnetic recording/reproduction apparatus comprising:

a perpendicular magnetic recording medium which comprises a nonmagnetic substrate, a soft magnetic backing layer formed on the nonmagnetic substrate, an oxidized layer formed by oxidizing a surface of the soft magnetic backing layer, a soft magnetic underlayer having a three-layered structure including a first soft magnetic layer formed on the oxidized layer, an interlayer formed on the first soft magnetic layer, and a second soft magnetic layer formed on the interlayer, and a perpendicular magnetic recording layer formed on the second soft magnetic layer;

a driving mechanism which supports and rotates the magnetic recording medium;

a magnetic head having an element to record information on the perpendicular magnetic recording medium and an element to reproduce the recorded information; and a carriage assembly which supports the magnetic head such that the magnetic head is movable with respect to the magnetic recording medium.

18. A magnetic recording/reproduction apparatus comprising:

(a) a perpendicular magnetic recording medium that includes:
(i) a nonmagnetic substrate,
(ii) a soft magnetic backing layer formed on the nonmagnetic substrate,
(iii) an oxidized layer formed by oxidizing a surface of the soft magnetic backing layer,
(iv) a soft magnetic underlayer formed on the oxidized layer,
(v) a crystalline orientation control layer containing nickel and formed on the soft magnetic underlayer, and
(vi) a perpendicular magnetic recording layer formed on the orientation control layer;

(b) a driving mechanism which supports and rotates the magnetic recording medium;

(c) a magnetic head having an element to record information on the perpendicular magnetic recording medium and an element to reproduce the recorded information; and (d) a carriage assembly which supports the magnetic head such that the magnetic head is movable with respect to the magnetic recording medium.

19. A medium according to claim 13, wherein the perpendicular magnetic recording layer contains cobalt, chromium, and platinum as a main component.

20. A medium according to claim 13, further comprises an alloy layer containing cobalt and chromium as a main component between the soft magnetic underlayer and the perpendicular magnetic recording layer.

21. A medium according to claim 13, which further comprises a longitudinal hard magnetic layer containing cobalt between the nonmagnetic substrate and the soft magnetic backing layer.

22. A magnetic recording/reproduction apparatus comprising:

(a) a perpendicular magnetic recording medium that includes:
  (i) a nonmagnetic substrate,
  (ii) a soft magnetic backing layer formed on the nonmagnetic substrate,
  (iii) an oxidized layer formed by oxidizing a surface of the soft magnetic backing layer,
  (iv) a soft magnetic underlayer formed on the oxidized layer,
  (v) a crystalline orientation control layer formed on the soft magnetic underlayer, and
  (vi) a perpendicular magnetic recording layer formed on the orientation control layer;

(b) a driving mechanism which supports and rotates the magnetic recording medium;

(c) a magnetic head having an element to record information on the perpendicular magnetic recording medium and an element to reproduce the recorded information; and (d) a carriage assembly which supports the magnetic head such that the magnetic head is movable with respect to the magnetic recording medium, wherein the soft magnetic backing layer and the soft magnetic underlayer contain cobalt as a main component and further contain at least one element selected from the group consisting of zirconium, hafnium, niobium, tantalum, titanium, and yttrium.

* * * * *